United States Patent [19]
Santos

[11] Patent Number: 5,337,582
[45] Date of Patent: Aug. 16, 1994

[54] SPLIT-TYPE AIR-CONDITIONING APPARATUS

[76] Inventor: Villamor B. Santos, 2000 Battery Park Rd., Chesapeake, Va. 23323

[21] Appl. No.: 98,826

[22] Filed: Jul. 29, 1993

[51] Int. Cl.⁵ ............................................ F28D 5/00
[52] U.S. Cl. ...................................... 62/311; 62/310; 62/436
[58] Field of Search ............... 62/310, 311, 314, 430, 62/435, 436

[56] References Cited

U.S. PATENT DOCUMENTS

| | | | |
|---|---|---|---|
| Re. 32,461 | 7/1987 | Di Peri | 62/314 |
| 1,428,661 | 9/1922 | Richardson | 62/310 |
| 1,954,455 | 4/1934 | Morse et al. | 62/435 |
| 2,780,078 | 2/1957 | Teplitz | 62/310 |
| 2,805,559 | 9/1957 | Hamilton | 62/310 |
| 4,090,370 | 5/1978 | Vaughan | 62/91 |

Primary Examiner—Henry A. Bennett
Assistant Examiner—William C. Doerrler

[57] ABSTRACT

A split-type air-conditioning apparatus is disclosed comprising the basic refrigeration component in combination with a chiller system defined by three water chambers, a refrigerant control before bare evaporator coil, a bare evaporator coil confined within said water chambers, a plurality of by-pass cooler tubes connecting two of said three water chambers, a blower means disposed on top of said reservoir, an air duct provided thereat to provide air flow defined by the entrance of air from the by-pass cooler tubes and leading to the blower means, and an endless net mesh disposed between said blower means and air duct directly along said air flow.

4 Claims, 3 Drawing Sheets

SPLIT-TYPE AIR-CONDITIONING APPARATUS

FIELD OF INVENTION

This invention relates generally to air-conditioning system but more particularly to a split-type air-conditioning apparatus having a chiller system adapted to be connected to a basic refrigeration system, i.e. compressor, condenser and refrigerant control, that cools the air and also allows the cool air to contain moisture to provide comfort.

BACKGROUND OF THE INVENTION

In places where the atmospheric air is dry, humidifiers are a necessity. This humidifier includes a housing having a fan to create an air flow, a water reservoir within the housing, and means to transfer water from the reservoir in to the air flow where it is evaporated and expelled into the surrounding atmosphere, thus wetting the air and bringing comfort to people within the room therefore. However, when atmospheric temperature rises during summer or hot weather, air-conditioners are required and humidifiers as above-mentioned are no longer used, as they add more heat to the atmosphere. The air-conditioners, on the other hand, although cools the air, the sane would make the air more drier.

The primary object of this invention therefore, is to provide a split-type air-conditioning apparatus having a chiller system with a secondary evaporator and a rotating net mesh that only half of the total energy consumption of an ordinary air-conditioning unit is used.

Another object of this invention is to provide a split-type air-conditioning apparatus that uses water as a secondary refrigerant, thus reducing the workload of the refrigeration system components and extending their life in the process.

Still an object of this invention is to provide a split-type air-conditioning apparatus that discharges cold air with moisture content that would not dry up the human skin unlike the conventional air-conditioning system.

Yet, an object of this invention is to provide a split-type air-conditioning apparatus whereby the condenser, compressor and the drier strainer are separated from the chiller system and be placed anywhere as desired by the owner.

Citing from the "Principles of Refrigeration" by Dossat 1978, page 172, "heat transfer by conduction is greater through liquid than through gases and the rate at which the refrigerant absorbs heat from the evaporator walls increases as the amount of interior wetted surface increases." In view thereof, still an object of this invention is to provide a split-type air-conditioning apparatus that utilizes the outside surface of" the evaporator in direct contact with water, using water as the medium in cooling air, instead of the air in direct contact with the outside surface of the evaporator.

The split-type air-conditioning apparatus according to the present invention comprises an insulated housing having a refrigerant control before bare evaporator coil, a substantially [substantially] U-shaped chilling water reservoir into which the evaporator coils are disposed, said reservoir consist of at least a left and a right chamber, and an upper intermediate chamber where an endless net mesh communicates. Below said intermediate chamber is a plurality of transverse by-pass cooler tubes that cools the air and allows the cold water from one chamber to transfer to the other. Opposed to the plurality of by-pass cooler tubes is an air duct that leads to a blower that sucks the air passing the by-pass cooler tubes and is blown to the atmosphere. Prior to the blower, is an endless net mesh, the lower portion of which is soaked to the chilling water in the intermediate chamber, the cold dry air from the air duct passes through the net mesh producing sub-cool air therefore.

DESCRIPTIONS OF DRAWINGS

DETAILED DESCRIPTION

Figure 1:
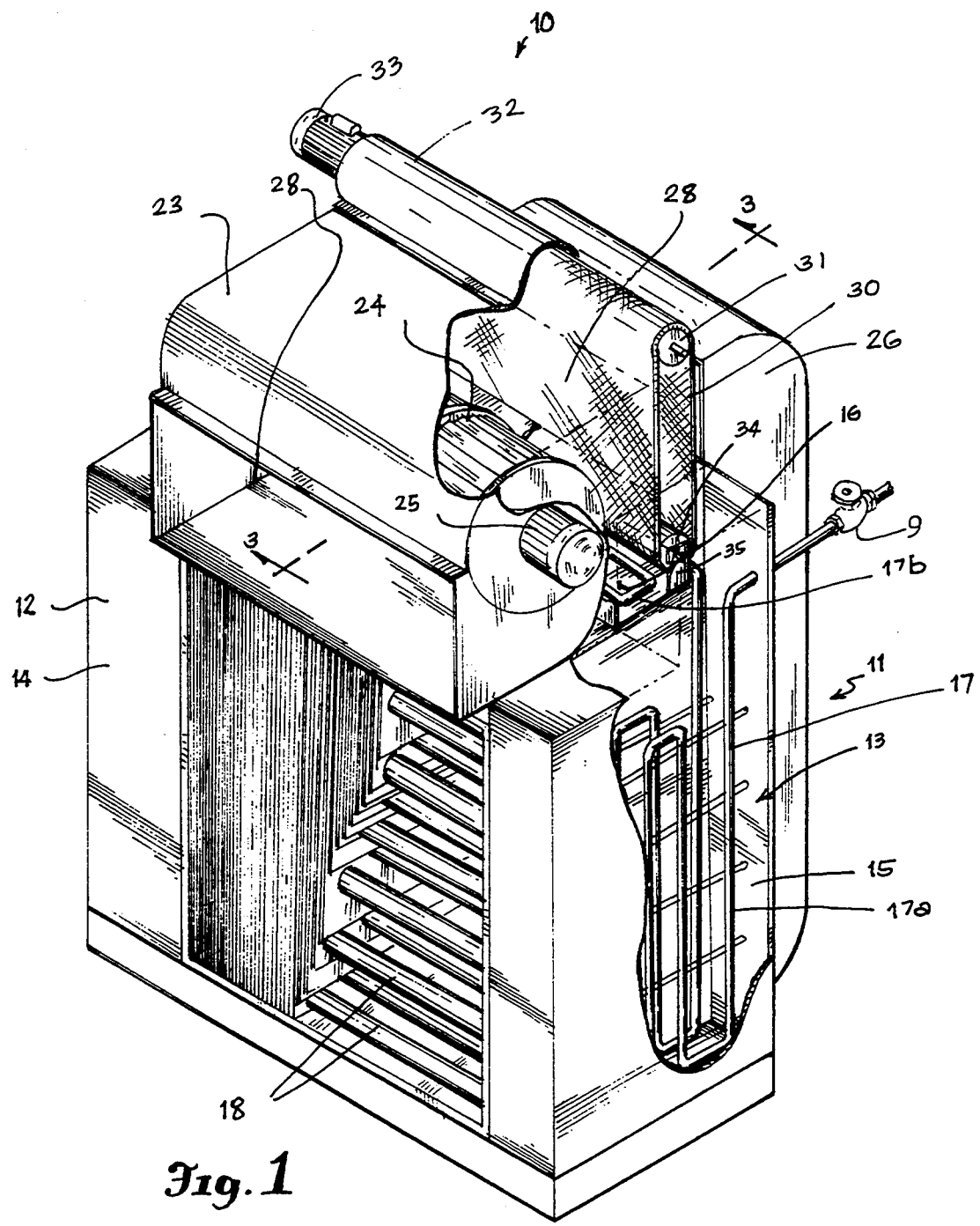
FIG. 1 is a perspective view of the split-type air-conditioning apparatus according to the present invention with partly cut-away to show internal parts.
Figure 2:
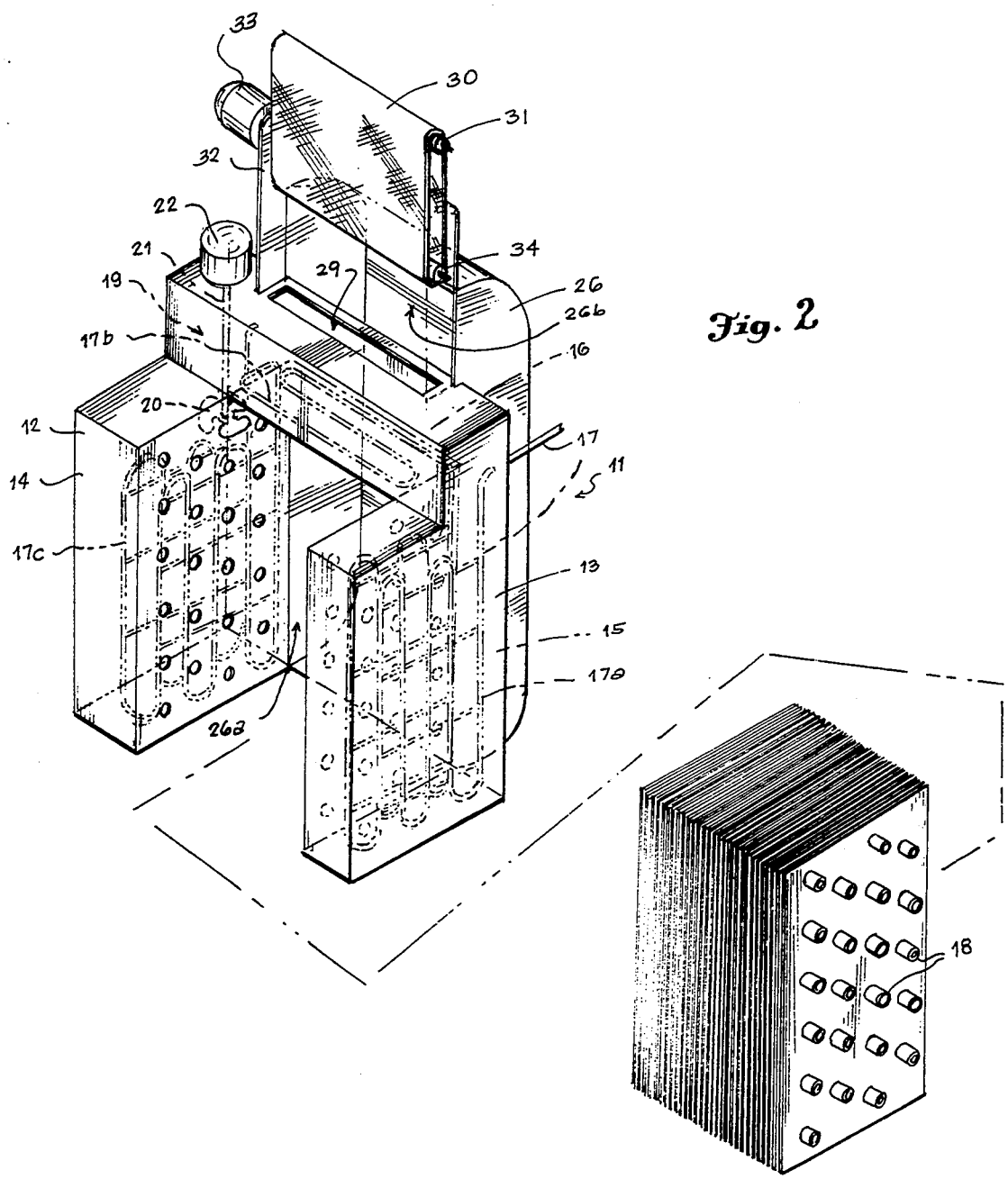
FIG. 2 is a partly exploded view of the split-type air-conditioning apparatus with blower housing not shown.

Referring now to the several views of the drawing, there is shown a split-type air-conditioning apparatus generally designated as reference numeral 10. Said air-conditioning apparatus generally includes a refrigerant control 9, an evaporator 11 of a basic refrigeration system, which is connected to a compressor, a condenser, and to a drier strainer (not shown being conventional). Said air-conditioning apparatus 10 comprises an insulated housing 12 defined by a substantially inverted U-shaped chilling water reservoir 13 consisting of at least three water chambers. The water chambers are the left water chamber 14, right water chamber 15 and intermediate water chamber 16 disposed at upper portion thereof and connecting said left and right water chamber. Said chambers of the chilling water reservoir are filled with water that is being cooled by bare evaporator coils 17. The bare evaporator coils 17 which are submerged in the water consists of a right chamber coils 17a, an intermediate chamber coils 17b extending from said right chamber coil 17a and left chamber coil 17c connected from the coil 17b and finally going out of the reservoir 13 towards the compressor.

At the front portion of the reservoir 13 is a plurality of transverse by-pass cooler tubes 18 connecting the left chamber 14 and the right chamber 15, wherein the water from the left chamber travels and transfer to the right chamber, thereby assuring that the water temperature on both chambers would be same. In order that transferring of water from one chamber to the other is facilitated, an agitator 19 is provided in one of said chamber. Said agitator 19 is defined by an agitator blade 20, attached to a vertical shaft 21 which in turn is coupled to an agitator motor 22 mounted on top of said reservoir 13.

On the front upper portion of said reservoir 13 is a blower housing 23 including a blower 24 within said housing 23 and rotatably driven by a motor 25 mounted thereat.

Said blower 24 sucks cold air from an air duct 26 disused at rear portion of said reservoir. The air intake port 26a of said air duct 26 is just right at the rear portion of the by-pass cooler tubes 18. The air flow therefore is defined by the entrance of air at the front portion of the by-pass cooler 18 and being cooled therefrom, said cool air, then, transverses the air duct 26 towards the suction line 27 of the blower housing 23 and thrown out from the discharge line 28 thereof.

Figure 3:
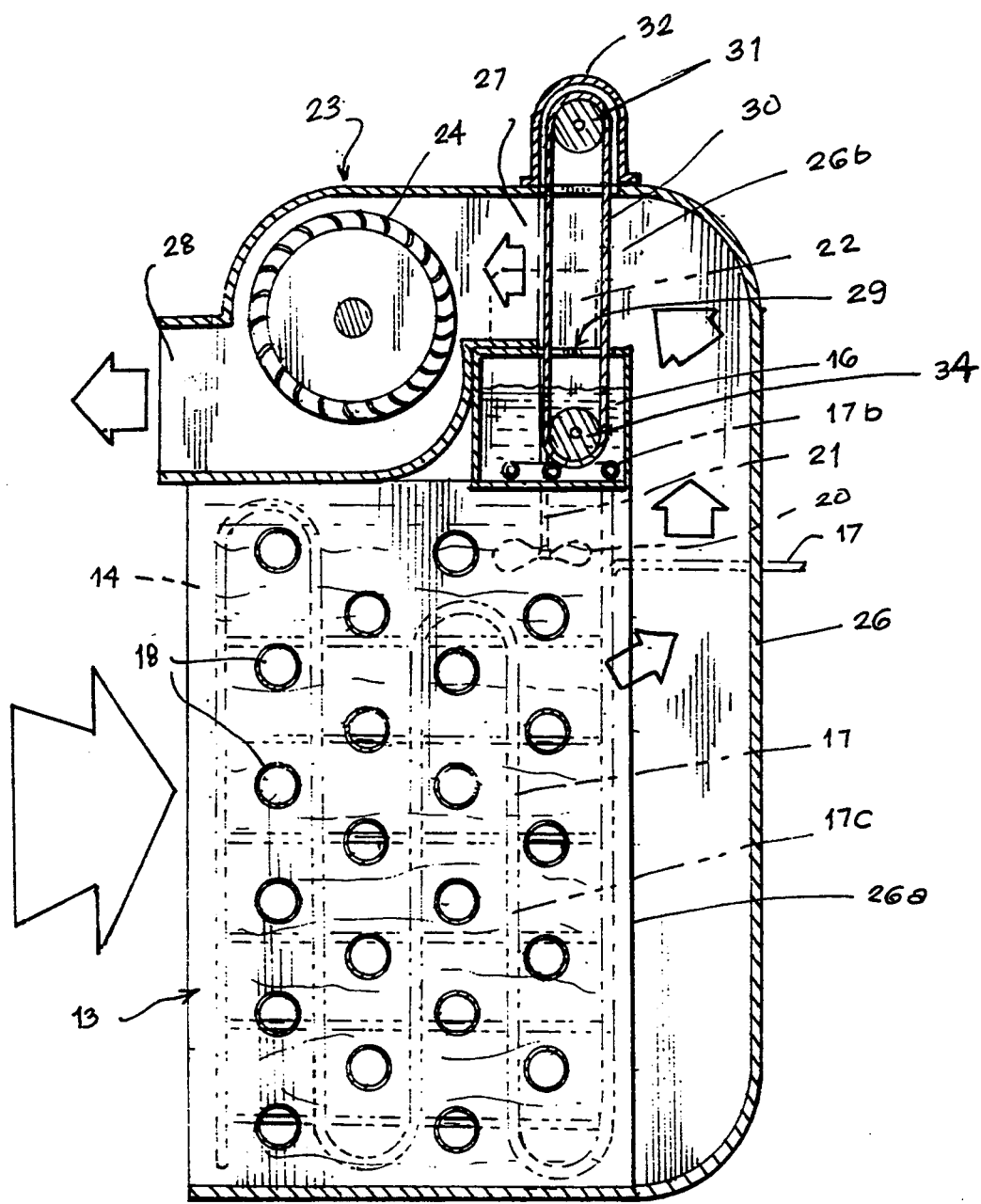
FIG. 3 is an illustrative cross-sectional view of said split-type air-conditioning apparatus taken along line 3—3 of FIG. 1.

At the rear portion of said blower housing 23 and on top of said reservoir 13 is a slot 29 whereby an endless net mesh 30 is inserted. As best seen in FIGS. 1 and 3, the endless net mesh 30 is mounted directly along the air flow, right in between the suction line 27 of the blower housing 23 and discharge port 26b of the air duct 26 said endless net mesh 30 includes upper roller 31 rotatably secured in net mesh housing 32 and driven by a driving means 33, and a lower roller 34 immersed and rotatably secured by holders 35 in said intermediate chamber 16.

As illustrated in FIG. 3, when the upper roller 31 is rotated by the driving means 33, the soak portion of the net mesh 30 rises up in a position directly in the air flow. The cool dry air from the air duct 26 picks up moisture from the net mesh 30 before entering the blower housing 23 thus moist cool air is discharged to the atmosphere from the blower housing 23 thereof.

I claim:

1. A split-type air-conditioning apparatus including a refrigerant control, and a evaporator connected to conventional refrigeration system such as a compressor, condenser, and a drier strainer, said comprising in combination:

an insulated water reservoir having at least three water chambers, the refrigerant control before the evaporator coil, said bare evaporator coil disposed in the three water chambers, a plurality of by-pass cooler tubes connected two of said three water chambers to provide transfer of water from one chamber to the other, an agitating means provided in one of said water chamber to facilitate circulation of water in said reservoir, a blower means mounted on top of said reservoir, an air duct disposed at the rear portion of said reservoir to transfer the air present at the area of the by-pass cooler tubes of the blower means, and an endless net mesh rotatably disposed in between said blower means and air duct, said endless net mesh having the lower portion thereof communication with the water inside one of said water chambers and allow water therefrom to be carried away by the cool air and contain moisture therefore.

2. An apparatus as described in claim 1 where in said agitating means includes an agitating blade attached to a vertical shaft and an agitator motor coupled to said shaft.

3. An apparatus as described in claim 1 wherein the endless net mesh passes through a slot provided on one of said water chambers and being driven by a motor attached to a housing provided therefore.

4. An apparatus as described in claim 1 wherein said blower means is defined by a blower housing mounted on top of said reservoir, a blower blade confined in said housing and being driven by a blower motor secured thereof.

* * * * *